(No Model.)

G. A. & R. F. DUNN.
REVOLVING SPRAYING APPARATUS.

No. 581,416. Patented Apr. 27, 1897.

Witnesses,

Inventors,
George A. Dunn
Robert F. Dunn

UNITED STATES PATENT OFFICE.

GEORGE AMBROSE DUNN AND ROBERT FRANKLIN DUNN, OF DINUBA, CALIFORNIA.

REVOLVING SPRAYING APPARATUS.

SPECIFICATION forming part of Letters Patent No. 581,416, dated April 27, 1897.

Application filed August 10, 1896. Serial No. 602,304. (No model.)

*To all whom it may concern:*

Be it known that we, GEORGE AMBROSE DUNN, a citizen of Canada, and ROBERT FRANKLIN DUNN, a citizen of the United States, both residing at Dinuba, county of Tulare, State of California, have invented an Improvement in Revolving Spraying Apparatus; and we hereby declare the following to be a full, clear, and exact description of the same.

Our invention relates to an apparatus which is especially designed to travel over the surface of the ground and act as a roller and at the same time to produce a spray of water or other liquid under pressure to be applied either to trees or for use upon roadways and for other similar purposes.

It consists in certain details of construction which will be more fully explained by reference to the accompanying drawings, in which—

Figure 1:
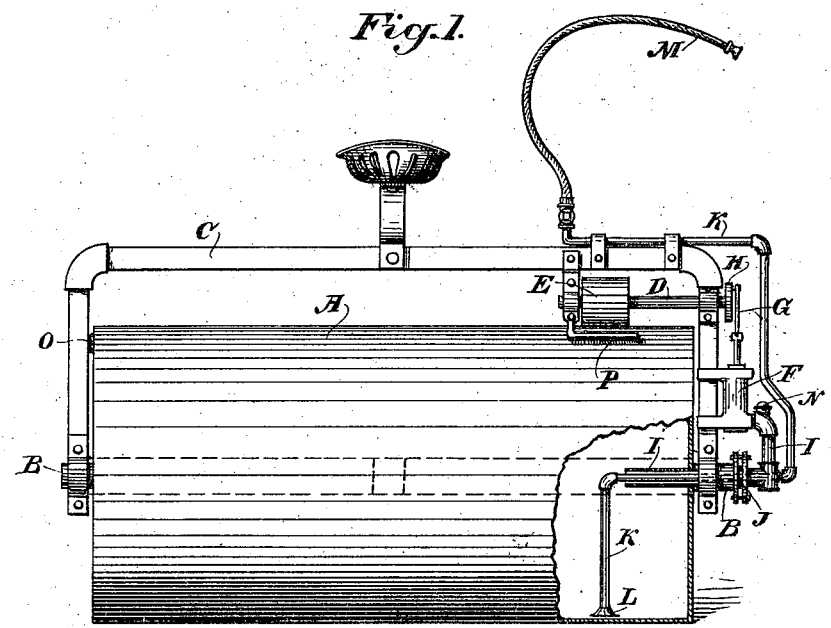
Figure 2:
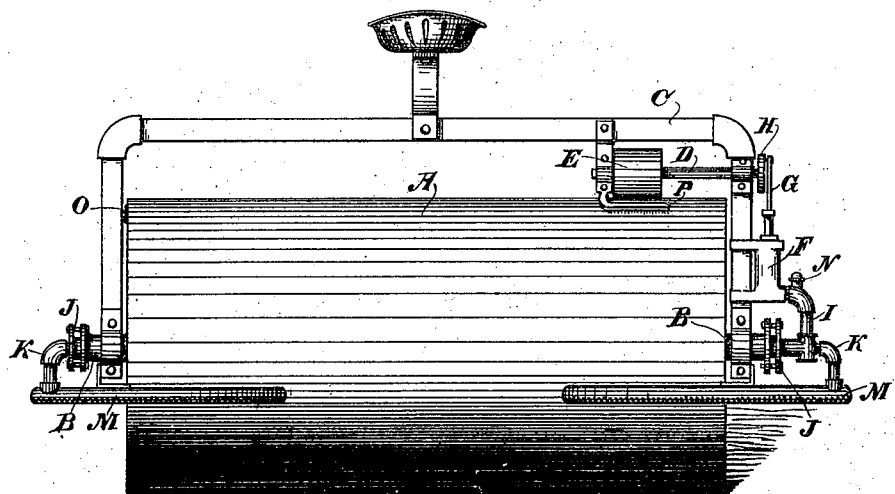

Figure 1 is a rear view of our apparatus, showing it used as a sprayer. Fig. 2 is a view showing it as a sprinkler.

A is a cylinder which may be made of any suitable material, as boiler iron or steel, and of sufficient strength to resist the internal pressure that may be applied to it. This cylinder has journals or trunnions B, which turn in a frame C, the frame being preferably made of tubular metal and of any suitable shape for the purpose. To this frame is connected the usual or ordinary means for drawing or propelling the device over the surface of the land or upon a road, the cylinder rolling upon the surface as it moves. At a suitable point on the frame C is journaled a shaft D, having a roller E fixed upon it and adapted to roll in contact with the drum or cylinder A.

F is an air-pump fixed to the frame C, and its plunger is actuated by a connecting rod or pitman G from the crank-wheel H, which is fixed upon the shaft D. From this pump a pipe I leads into the end of the hollow shaft or trunnion B at that side, passing through a suitable stuffing-box J, which prevents leakage at this point. This pipe is of sufficient diameter to admit of a second pipe K inside of it, as shown. The pipe K has an angular bend, which allows its lower end to extend down to a point near the bottom of the interior of the cylinder A, where it is provided with a strainer L. At the opposite end this pipe passes out through the side of the pipe I, with provision for making a tight joint at this point, and thence leads to any desired point of discharge.

If the apparatus is to be used for spraying trees, the pipe may terminate in a hose and nozzle adapted for this purpose, as shown at M. If to be used for street sprinkling, the pipe K is correspondingly bent after emerging from the shaft or trunnions B and carried to the point where it is desired to deliver the water to any of the usual or well-known forms of sprinklers employed for this purpose.

The operation of the device will then be as follows: The tank A is partially filled with the liquid to be used. If it is to be used for street purposes, it may be ordinary water, and the tank is provided with a suitable opening, as at O, for refilling when exhausted. If a solution is to be used, as in the case of spraying trees, it will be introduced in the same manner, and the machine being started the rolling of the drum or cylinder keeps the solution agitated and in proper condition to be applied to the trees. In addition to this the apparatus acts as a roller to crush any clods and to generally keep the surface in good shape. The contact-wheel E is kept in rotation by the action of the cylinder, and through its shaft D and the crank at H it actuates the air-pump, thus forcing a supply of air through the pipe I into the interior of the cylinder, where as much pressure may be accumulated as is desired. This pressure acting upon the surface of the liquid in the cylinder constantly forces it out through the pipe K, when a controlling-cock is opened, and thence to the nozzle or other discharge M.

It will be seen that the rotation of the cylinder upon the ground will produce sufficient pressure within it to allow it to be stopped whenever a tree is reached and the tree thoroughly sprayed before proceeding. The travel between that and the next tree will again produce a sufficient pressure within the cylinder, and thus the work is continued.

When used as a street-sprinkler, the air-supply will always be sufficient to keep the proper pressure upon the liquid in the cylinder.

N is a safety-valve for the air-pump connection, and P is a brush or scraper adapted to keep that portion of the cylinder clear against which the roller E impinges.

Having thus described our invention, what we claim as new, and desire to secure by Letters Patent, is—

1. A sprinkling apparatus consisting of a hollow cylinder or roller, a frame within which it is journaled and to which power may be applied to move it over the ground, a shaft journaled upon said frame having fixed to it a wheel or roller adapted to make contact with the periphery of the cylinder whereby the shaft is revolved, a cleaner acting on the surface of the cylinder in advance of the wheel or roller, to keep that portion of the cylinder clean which the roller engages, a crank fixed upon the shaft and an air-pump with which it is connected, a pipe leading therefrom to the interior of the cylinder, and a discharge-pipe leading from the interior of the cylinder whereby the liquid contained therein is delivered under pressure.

2. A spraying or sprinkling device consisting of a hollow cylinder or roller adapted to contain liquid, a frame in which the trunnions of said cylinder are journaled and to which power may be applied to propel it over the ground, a shaft having a roller making contact with the outer periphery of the cylinder and rotated thereby, a crank upon said shaft, an air-pump connected therewith, a pipe leading from the air-pump through the trunnion of the roller and delivering air to the interior of the cylinder, a second pipe extending through the air-pipe so as to leave a circumscribing air-passage, having its mouth terminating within the cylinder near the bottom and the outer end connected with a sprinkling or spraying device.

In witness whereof we have hereunto set our hands.

GEORGE AMBROSE DUNN.
ROBERT FRANKLIN DUNN.

Witnesses:
W. P. BOONE,
S. L. BLEDSOE.